United States Patent
Park et al.

(10) Patent No.: US 9,344,968 B2
(45) Date of Patent: May 17, 2016

(54) APPARATUS FOR BOOSTING MIMO (MULTI-INPUT MULTI-OUTPUT) SIGNAL IN A WIRELESS COMMUNICATION SYSTEM AND METHOD THEREOF

(71) Applicant: LG ELECTRONICS INC., Seoul (KR)

(72) Inventors: Sungho Park, Anyang-si (KR); Kyujin Park, Anyang-si (KR); Jiwoong Jang, Anyang-si (KR); Hangyu Cho, Anyang-si (KR); Jiwon Kang, Anyang-si (KR); Dongcheol Kim, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/407,281

(22) PCT Filed: Jun. 17, 2013

(86) PCT No.: PCT/KR2013/005313
§ 371 (c)(1),
(2) Date: Dec. 11, 2014

(87) PCT Pub. No.: WO2013/187744
PCT Pub. Date: Dec. 19, 2013

(65) Prior Publication Data
US 2015/0119097 A1   Apr. 30, 2015

Related U.S. Application Data (60) Provisional application No. 61/659,978, filed on Jun. 15, 2012.

(51) Int. Cl.
*H04W 52/24* (2009.01)
*H04W 52/06* (2009.01)
*H04W 52/04* (2009.01)
(Continued)

(52) U.S. Cl.
CPC .............. *H04W 52/06* (2013.01); *H04W 52/04* (2013.01); *H04W 52/50* (2013.01); *H04W 52/242* (2013.01); *H04W 52/362* (2013.01)

(58) Field of Classification Search
CPC .......................... H04W 52/242; H04W 52/362
USPC ........... 455/522, 69, 452.1, 509, 452.2, 67.11
See application file for complete search history.

(56) References Cited

U.S. PATENT DOCUMENTS

| | | | |
|---|---|---|---|
| 6,801,759 | B1 | 10/2004 | Saifuddin |
| 7,277,721 | B2 | 10/2007 | Okumura et al. |
| 2004/0005906 | A1 | 1/2004 | Okumura et al. |

(Continued)

FOREIGN PATENT DOCUMENTS

| | | |
|---|---|---|
| JP | 2003-338762 A | 11/2003 |
| JP | 2004-510390 A | 4/2004 |
| JP | 2009-521878 A | 6/2009 |
| JP | 2011-29851 A | 2/2011 |
| JP | 2011-146848 A | 7/2011 |
| KE | 10-2004-0019783 A | 3/2004 |
| KR | 2003-0042475 A | 5/2003 |
| KR | 10-2010-0043790 A | 4/2010 |

(Continued)

*Primary Examiner* — John J Lee
(74) *Attorney, Agent, or Firm* — Birch, Stewart, Kolasch & Birch, LLP (57) ABSTRACT

An apparatus for boosting an MIMO (multi-input multi-output) signal and method thereof are disclosed. The present invention includes determining an initial transmit power value of the signal booster and applying an initial transmit power increment/decrement value to a sum of the initial transmit power value and the initial transmit power increment/decrement value in each preset time interval during an initial power control period.

9 Claims, 7 Drawing Sheets (51) Int. Cl.
  *H04W 52/50*  (2009.01)
  *H04W 52/36*  (2009.01)

(56) References Cited

U.S. PATENT DOCUMENTS

| | | |
|---|---|---|
| 2004/0110477 A1 | 6/2004 | Nishimura et al. |
| 2007/0149235 A1 | 6/2007 | Chin et al. |
| 2011/0159914 A1* | 6/2011 | Chen .................. H04W 52/367 |
| | | 455/522 |
| 2011/0243007 A1* | 10/2011 | Xiao ..................... H04B 7/0447 |
| | | 370/252 |
| 2011/0249715 A1* | 10/2011 | Choi ................. H04W 52/0274 |
| | | 375/222 |
| 2012/0052796 A1 | 3/2012 | Takano |
| 2012/0300695 A1 | 11/2012 | Higuchi |

FOREIGN PATENT DOCUMENTS

| | | |
|---|---|---|
| KR | 10-2010-0059300 A | 6/2010 |
| WO | WO 03/010903 A1 | 2/2003 |

* cited by examiner

FIG. 1

UL (in viewpoint of source device, transmission)

DL (in viewpoint of source device, reception)

APPARATUS FOR BOOSTING MIMO (MULTI-INPUT MULTI-OUTPUT) SIGNAL IN A WIRELESS COMMUNICATION SYSTEM AND METHOD THEREOF

CROSS REFERENCE TO RELATED APPLICATIONS

This application is the National Phase of PCT International Application No. PCT/KR2013/005313, filed Jun. 17, 2013, which claims priority under 35 U.S.C. 119(e) to U.S. Provisional Application No. 61/659,978, filed on Jun. 15,2012, all of which are hereby expressly incorporater by reference into the present application.

TECHNICAL FIELD

The present invention relates to a wireless communication system, and more particularly, to an apparatus for boosting an MIMO (multi-input multi-output) signal and method thereof

BACKGROUND ART

A signal booster or a relay node has been developed/installed to overcome signal loss in a shadow area and to extend a coverage for a signal. For such purposes, the signal boosters can be classified into a fixed type, a nomadic type and a mobile type according to installation purposes and configurations. Moreover, the signal boosters can be sorted by A & F (amplify & forward), D & F (decode and forward), M & F (modulation & forward) and the like depending on whether a separate signal processing is additionally performed. Currently, in IEEE 802.16m, IEEE 802.16mmr, 3GPP LTE/ LTE-A and the like, the signal booster or relay node is supported by the corresponding system. Yet, in the conventional communication systems, the fixed A & F signal boosters are mostly popular. This is attributed to the following reasons. First of all, a communication system of a related art does not support a signal booster by itself. Secondly, it is highly possible that a delay time due to a signal transceiving and processing in an booster of a cellular system supposed to mainly support such a bi-directional real-time packet service as a voice service and the like may exceed a limited time determined by the corresponding system. So to speak, when a base station is not aware of a presence or non-presence of installation/use of a signal booster, the A & F signal booster is the most reasonably available signal booster.

In case that a fixed or nomadic signal booster is installed to solve the problem of signal loss in a shadow area, it is able to maintain a fixed uplink transmit power. However, in case that a mobile signal booster is installed, a transmit power of a fixed output causes serious interference to other neighbor user equipments due to a channel change according to mobility and a corresponding variation of signal loss. Moreover, in viewpoint of a user equipment using a signal booster, power may be consumed unnecessarily.

TECHNICAL TASK

The technical task of the present invention is to provide a signal booster and method of controlling a power of the same, by which when a mobile signal booster configured to perform a transmission with a fixed transmit power is used, the inefficiency of power consumption and interference on other user equipments can be reduced.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, a method of controlling a power of a signal booster in a wireless communication system according to one embodiment of the present invention includes the steps of determining an initial transmit power value of the signal booster and applying an initial transmit power increment/ decrement value to a sum of the initial transmit power value and the initial transmit power increment/decrement value in each preset time interval during an initial power control period.

To further achieve these and other advantages and in accordance with the purpose of the present invention, a signal booster in a wireless communication system according to another embodiment of the present invention includes a transceiving module and a processor determining an initial transmit power value of the signal booster, the processor applying an initial transmit power increment/decrement value to a sum of the initial transmit power value and the initial transmit power increment/decrement value in each preset time interval during an initial power control period.

Preferably, the initial transmit power value may result from applying an offset value to a maximum transmit power of the signal booster.

Preferably, the initial transmit power value may result from subtracting a signal loss value from a maximum transmit power of the signal booster.

More preferably, the signal loss value may be determined in statistical signal loss data previously saved in the signal booster.

Preferably, the initial transmit power value may include a value recognized by the signal booster.

Preferably, the initial transmit power value may include a transmit power value of a user equipment transmitting a signal to be boosted by the signal booster.

Preferably, the initial transmit power value may include a value estimated by the signal booster.

Preferably, the initial power control period may include a period taken for a difference between a value having the initial transmit power increment/decrement value applied thereto and a transmit power value of a user equipment transmitting a signal to be boosted by the signal booster to become equal to or smaller than a preset value.

Preferably, the initial transmit power increment/decrement value may vary in the each preset time interval.

Preferably, the preset time interval may include an integer multiplication of at least one of a symbol, subframe and frame of a communication system including the signal booster.

Preferably, the power controlling method may be expressed as a following formula:

$$P_{signalbooster}(0) = P_{init\_signalbooster} + \Delta P_{init}\text{ if } t=0;\text{ and}$$

$$P_{signalbooster}(t) = P_{signalbooster}(t-t0) + \Delta P_{init} \text{ if } t \leq t_{initial\_period}.$$

In this case, the $P_{signalbooster}(t)$ may indicate a transmit power value at a time t, the $P_{init\_signalbooster}$ may indicate the initial transmit power value, the $\Delta P_{init}$ may indicate the initial transmit power increment/decrement value, and the t0 may indicate the preset time interval.

Preferably, the power controlling method of the signal booster after the initial power control period may be expressed as a following formula:

$$P_{signalbooster}(t) = P_{signalbooster}(t-t0) + \Delta P.$$

In this case, the $P_{signalbooster}$ (t) may indicate a transmit power value at a time t, the $\Delta P$ may indicate the transmit power increment/decrement value, and the t0 may indicate a preset time interval.

Preferably, a user equipment transmitting a signal to be boosted by the signal booster may transmit at least one of an information indicating whether to transmit a signal via the signal booster, a current transmit power of the signal booster and a maximum transmit power of the signal booster to a base station.

The above-mentioned general description of the present invention and the following details of the present invention are exemplary and may be provided for the additional description of the invention disclosed in claims.

ADVANTAGEOUS EFFECTS

Accordingly, the present invention may provide the following effects and/or features.

First of all, according to the present invention, in operating and managing a mobile signal booster, efficiency for power consumption of a user equipment can be increased.

Secondly, First of all, according to the present invention, in operating and managing a mobile signal booster, interference on neighbor user equipments can be efficiently reduced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

BEST MODE FOR INVENTION

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable.

Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system. 3GPP system, 3GPP LTE system,3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e specifications (e.g., WirelessMAN-OFDMA reference system) and advanced IEEE 802.16m specifications (e.g., WirelessMAN-OFDMA advanced system). For clarity, the following description mainly concerns 3GPP LTE system or 3GPP LTE-A system, by which the technical idea of the present invention may be non-limited.

Figure 1:
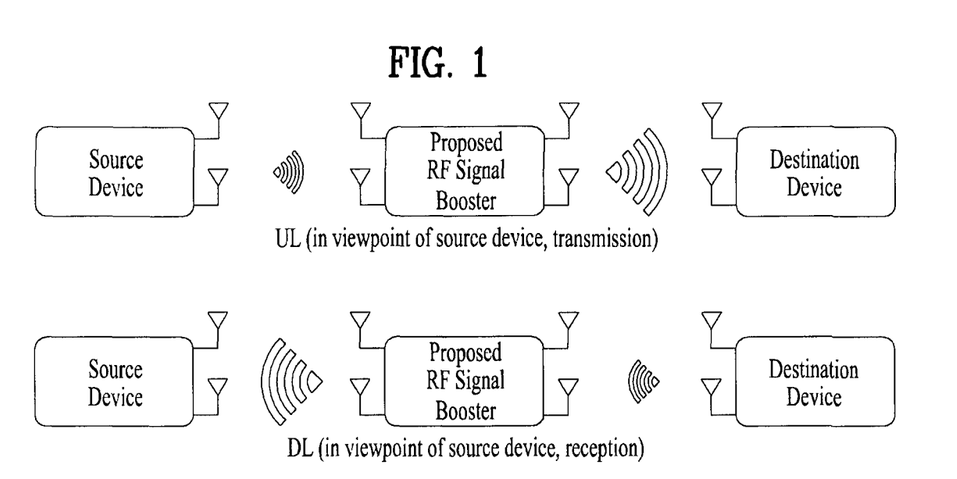
FIG. 1 is a diagram of a system to which a signal booster according to the present invention is applicable.

FIG. 1 is a diagram of a system to which a signal booster according to the present invention is applicable.

Referring to FIG. 1, a system, to which a signal booster is applicable, includes a source device configured to transmit an RF (radio frequency) signal, a signal booster configured to receive, boost and transmit the RF signal to a destination device, and the destination device configured to receive the signal finally. This description is made in viewpoint of uplink (UL). In viewpoint of downlink (DL), the destination device boosts the RF signal from the destination device and then transmits the boosted signal to the source device. In this system, the destination/source device may include one of a base station an access point (AP), a user equipment (UE) and the like. In particular, the destination device and the source device may perform communications by the same communication protocol or different communication protocols.

Figure 2:
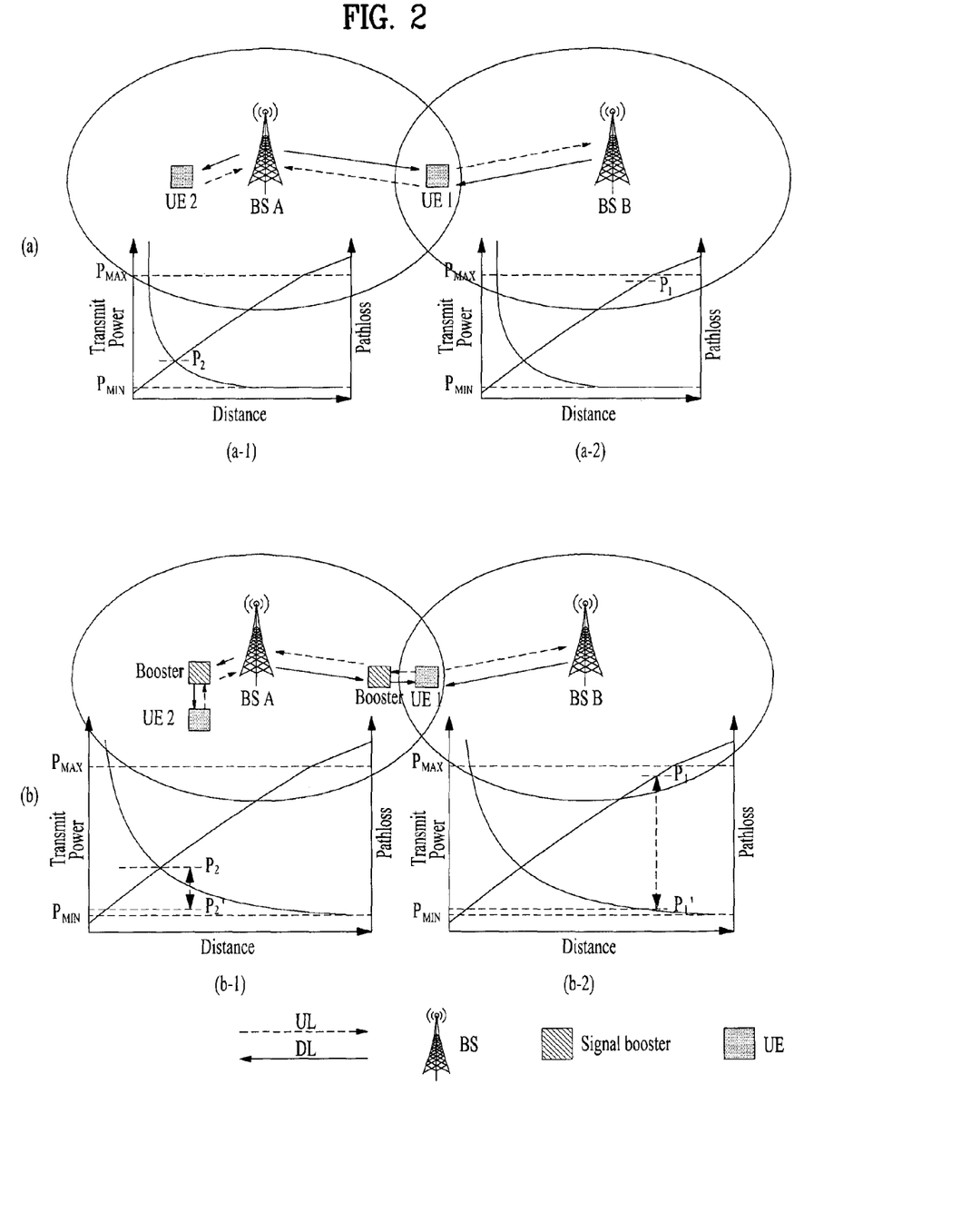
FIG. 2 and FIG. 3 are diagrams to describe cases of applying a signal booster failing in adopting a power control scheme.

FIG. 2 is a diagram to examine a case of applying a signal booster, to which a power control scheme is not applied, in the environment shown in FIG. 1. In particular, FIG. 2 (a) shows a situation of communication between a general base station and a user equipment in case of not using a signal booster. And, FIG. 2 (b) shows a situation of communication between a base station and a user equipment in case of using a signal booster to which a power control scheme is not applied. In FIG. 2, assume that a user equipment (UE1 or UE2) and a base station (BS A) include the source device and the destination device in the system shown in FIG. 1, respectively. In FIG. 2, assume that the user equipment 1 (i.e., a cell edge user) is located at a cell edge between the base station A and the base station B. And, assume that the user equipment 2 is located adjacent to the base station A. In this case, a serving base station of each of the user equipment 1 and the user equipment 2 includes the base station A. And, a booster may include a mobile signal booster. FIG. 2 (a-1) is a graph relating to a transmit power of the user equipment 1 in consideration of a distance and path loss. And, FIG. 2 (a-2) is a graph relating to a transmit power of the user equipment 2 in consideration of a distance and path (i.e., a path loss). FIG. 2 (b-1) is a graph relating to a transmit power of a signal booster of the user equipment 1 in consideration of a distance and path loss. And, FIG. 2 (b-2) is a graph relating to a transmit power of a signal booster of the user equipment 2 in consideration of a distance and path loss. In each of the graphs, Pmax indicates a maximum transmit power of a user equipment, Pmin indicates a minimum transmit power of a user equipment, P1 indicates an uplink (UL) transmit power of the user equipment 1, P2 indicates a UL transmit power of the user equipment 2, P1' indicates a transmit power of a signal booster related to the user equipment 1, and P2' indicates a transmit power of a signal booster related to the user equipment 2.

Referring to FIG. 2 (a), in downlink (DL) viewpoint of a general case, reception sensitivity of a signal from the base station A in the user equipment 1 may be almost similar to that of a signal from the base station B in the user equipment 1, which may be likely to apply to an uplink (UL) case. Hence, the UL transmit power P1 of the user equipment 1 may be close to the maximum transmit power Pmax of the user equipment. On the other hand, in case of the user equipment 2, a signal from the base station A is likely to be much greater than that from the base station B. Hence, the UL transmit power P2 of the user equipment 2 to the base station may become smaller than the UL transmit power of the user equipment 1.

Figure 3:
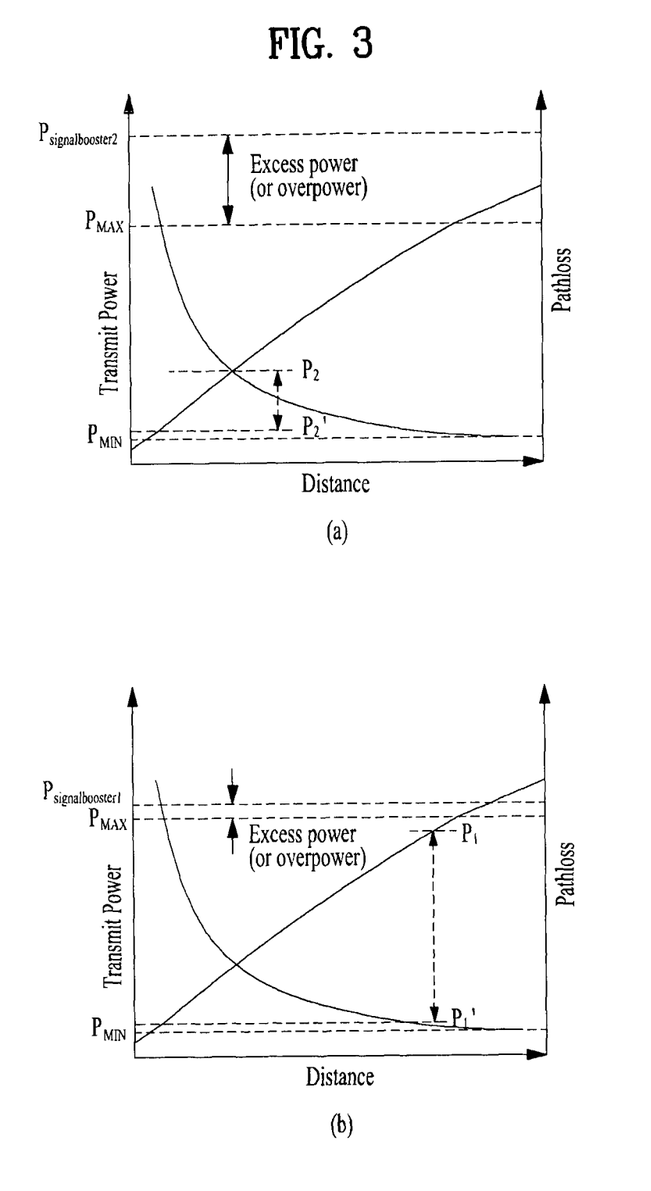

If a signal booster is used, the UL transmit power of each of the user equipment 1 and the user equipment 2, with is described with reference to FIG. 2 (a), can be changed. This is described with reference to FIGS. 2 (b) to 3 as follows. In doing so, the case of using the signal booster can be classified into: 1) a case that the signal booster continues to be used from the past; and 2) a case that a user equipment accesses the signal booster at a current timing point. In the following description, each of the case 1) and the case 2) shall be explained.

First of all, in case that the signal booster continues to be used from the past, referring to FIG. 2 (b-1) and FIG. 2 (b-2), a transmit power of each of the user equipments may be approximate to the minimum transmit power Pmin. This is because it is enough to perform a transmission of an RF signal with a transmit power enough to deliver the RF signal to a signal booster adjacent to each of the user equipment 1 and the user equipment 2. In this case, a transmit power P_signalbooster1 of the signal booster related to the user equipment 1 (i.e., the signal booster configured to boost and transmit the UL signal of the user equipment 1 to the base station) may be similar to the transmit power value P1 of the user equipment 1 in case of not using the signal booster. Yet, in special cases, for example, a signal booster, which considers a case that a user equipment will experience a severer signal loss, may be able to transmit a signal with a transmit power much greater than the above transmit power. On the other hand, a transmit power P_signalbooster2 of the signal booster related to the user equipment 2 may become a maximum transmit power (i.e., a fixed transmit power value) of the signal booster and becomes a value equal to or greater than the maximum transmit power of the user equipment (i.e., P_signalbooster2≥Pmin), thereby causing such effect as acceleration of disturbances caused to the base station and other user equipments and strong interferences on the base station and other user equipments.

Secondly, in case that a user equipment accesses the signal booster at a current timing point, compared to the first case, a relation between the user equipment and the signal booster can be additionally taken into consideration.

Referring now to FIG. 2 (b), in case of the user equipment, a UL transmission may be performed with the transmit power P1 close to the maximum transmit power Pmax of the user equipment right before using the signal booster. In this case, if a user equipment uses a signal booster for a UL signal transmission, the user equipment's UL transmit power known to a base station may be considerably changed. Generally, a user equipment's maximum transmit power assumed in a cellular communication by 3GPP LTE or the like amounts to 200 mW (23 dBm) or 251 mW (24 dBm). Yet, a maximum transmit power assumed for a signal booster, a relay or the like amounts to 1 W (30 dBm) or 5 W (37 dBm) and is much greater than the maximum transmit power of the user equipment. If the base station is capable of accepting a rapid transmit power change attributed to using a signal booster, the base station may make a request for an appropriate transmit power to the user equipment 1 through a power adjustment period of a predetermined time by a UL transmit power control scheme provided by a cellular communication system. Yet, during this period, the user equipment causes considerable interference to neighbor user equipments as well consumes a considerable power unnecessarily. Moreover, since a considerably large operation range is required in aspect of an input power of a power amplifier, a device cost may be raised.

In case of the user equipment 2, an input power to a signal booster may be relatively lower than that in case of the user equipment 1. Yet, the input power is greater than an appropriate transmit power Pmin of a user equipment in case of using a signal booster. Moreover, since the differences among the UL signal transmit power of the user equipment 2 known to the base station, the actual transmit power of the user equipment 2 and the transmit power of the signal booster are not insignificant, power may be unnecessarily wasted and strong interference may be caused to a neighbor user equipment.

Therefore, a method of controlling a transmit power in a signal booster according to an embodiment of the present invention is described in the following description to solve the problem of inefficiency of power consumption in case of using the aforementioned signal booster of the fixed transmit power and the like.

First of all, a power control in case of an initial access of a user equipment (i.e., in case that a user equipment initially accesses a signal booster) is described with reference to FIGS. 4 to 6 as follows.

Figure 4:
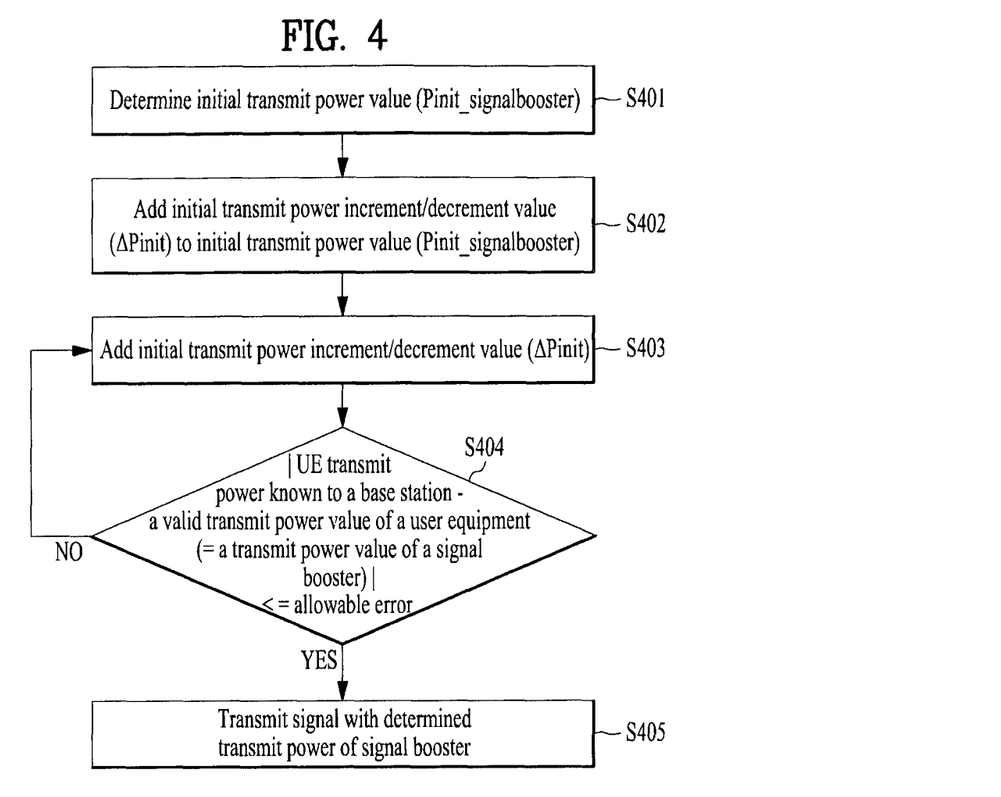
FIGS. 4 to 6 are flowcharts for a method of controlling an initial transmit power in a signal booster according to one embodiment of the present invention.

FIG. 4 is a flowchart for a method of controlling an initial transmit power in a signal booster according to one embodiment of the present invention.

Referring to FIG. 4, a signal booster determines an initial transmit power value ($P_{init\_signalbooster}$) for a case of an initial access of a user equipment and adds an initial transmit power decrement/increment value ($\Delta P_{init}$) to a sum of the initial transmit power value ($P_{init\_signalbooster}$) and the initial transmit power increment/decrement value ($\Delta P_{init}$) [S401, S402]. After a preset time (t0), the initial transmit power increment/decrement value ($\Delta P_{init}$) is added [S403].

It is determined whether a difference between a result value (e.g., a valid transmit power value of a user equipment, a transmit power value of a signal booster) up to the step S403 and a UE transmit power known to a base station is equal to or greater than a (preset) allowable error. If the difference lies within the allowable error, the user equipment determines the result value as a transmit power ($P_{signalbooster}$) of a signal booster [S405]. Based on this determination, a UL signal received from the user equipment can be transmitted to the base station. On the contrary, if the difference is greater than the allowable error, the routine goes back to the step S403 and then adds the initial transmit power increment/decrement value ($\Delta P_{init}$). In particular, the initial transmit power increment/decrement value ($\Delta P_{init}$) is added each preset time interval.

In the step S405, the time taken to finally determine an initial transmit power ($P_{signalbooster}$) of the signal booster can be called an initial power control time. In particular, as mentioned in the foregoing description of the steps, the initial power control time is the time taken for a difference between the user equipment's transmit power value known to the base station and the effective transmit power value of the user equipment (i.e., the transmit power of the signal booster used by the user equipment) to arrive into a predetermined range (i.e., a predetermined value).

The transmit power ($P_{signalbooster}$) of the signal booster may be expressed as Formula 1.

$$P_{signalbooster}(0) = P_{init\_signalbooster} + \Delta P_{init} \text{ if } t=0$$

$$P_{signalbooster}(t) = P_{signalbooster}(t-t0) + \Delta P_{init} \text{ if } t \leq t_{initial\_period}. \quad \text{[Formula 1]}$$

In Formula 1, the $P_{signalbooster}(t)$ indicates a transmit power at a time t, the $P_{init\_signalbooster}$ indicates the initial transmit power, and the $\Delta P_{init}$ indicates the initial transmit power increment/decrement value, and the t0 indicates the preset time interval.

The above-described contents are re-examined with reference to FIG. 5 as follows. In FIG. 5, 'P' indicates a transmit power when a user equipment performs a UL transmission to a base station before using a signal booster. At a time (t=0) for a user equipment to access a signal booster, the signal booster determines an initial transmit power value ($P_{init\_signalbooster}$) and then adds an initial transmit power increment/decrement value ($\Delta P_{init}$) thereto. In the drawing, the difference between the transmit power value of the user equipment and the transmit power of the signal booster is not in a predetermined range, a value of the transmit power ($P_{signalbooster}$) of the signal booster is determined in a manner of repeating the step of adding the initial transmit power increment/decrement value ($\Delta P_{init}$) in an interval of the preset time (t0) until the corresponding value arrives into this range.

Figure 5:
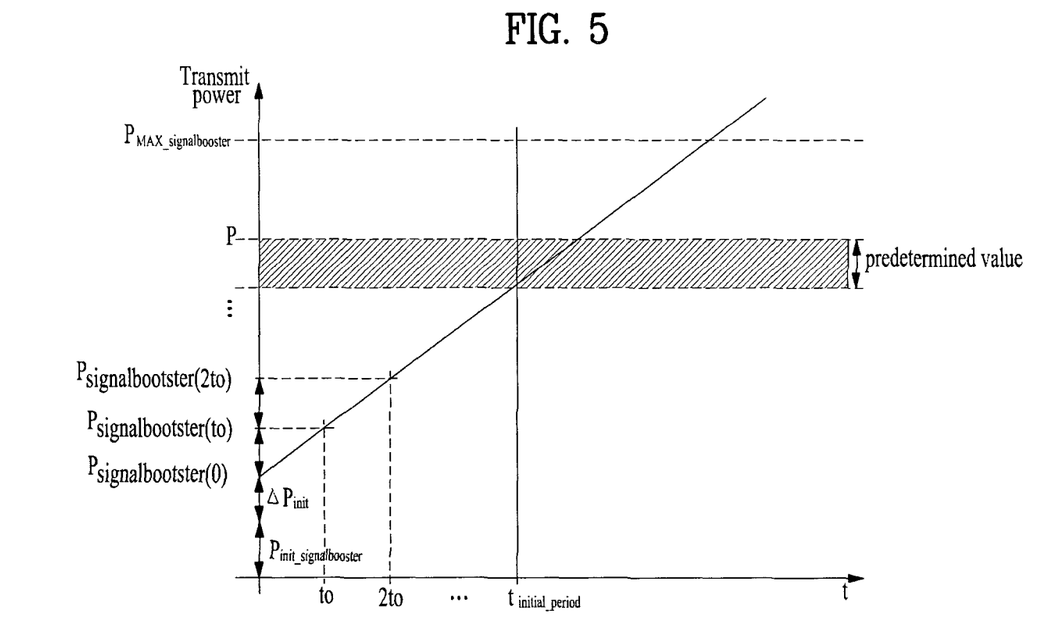
Figure 6:
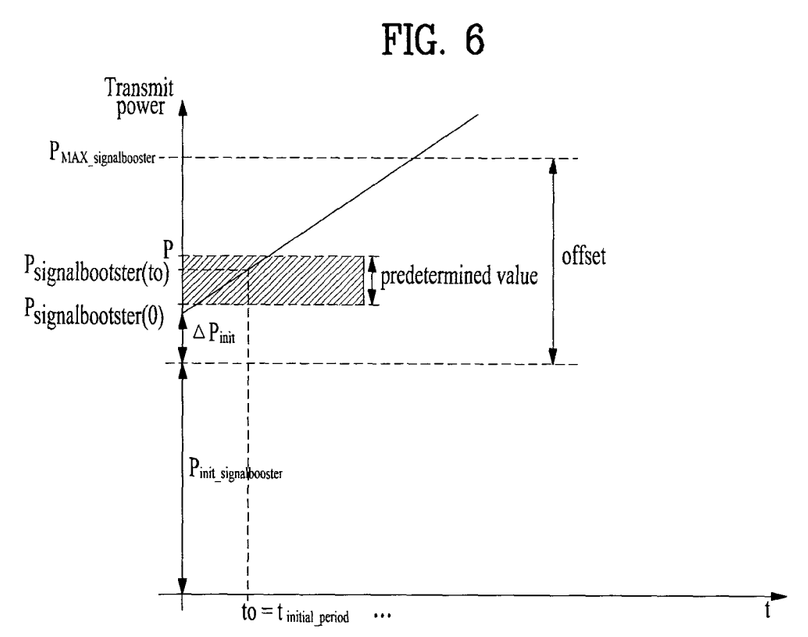

Yet, as observed from FIG. 5, if a difference between the transmit power value of the user equipment and the initial transmit power value ($P_{init\_signalbooster}$) initially set by the signal booster is considerable, the step of adding the initial transmit power increment/decrement value ($\Delta P_{init}$) should be repeated several times. Referring to FIG. 6, an initial power control time can be reduced in a manner of setting the initial transmit power value ($P_{init\_signalbooster}$) appropriately. In particular, it is able to set the initial transmit power value ($P_{init\_signalbooster}$) by the following method.

First of all, the initial transmit power value ($P_{init\_signalbooster}$) can be set to a random value within a transmit power range of a signal booster [Passive Setting].

For instance, the initial transmit power value ($P_{init\_signalbooster}$) can be set to a value resulting from subtracting an offset value according to a user input from a maximum transmit power of the signal booster. In particular, the signal booster stores a statistical signal loss model (or value) in accordance with each place and situation. The signal booster recognizes it through user's direct/indirect input and is then able to determine the initial transmit power value ($P_{init\_signalbooster}$) as a value resulting from subtracting a signal loss value in the corresponding situation from the maximum transmit power of the signal booster.

Alternatively, the signal booster stores a value resulting from adding an offset value according to a user input to a minimum transmit power of the signal booster (e.g., a statistical signal loss model (or value) in accordance with each place and situation). The signal booster recognizes it through user's direct/indirect input and is then able to determine the initial transmit power value ($P_{init\_signalbooster}$) as a value resulting from adding a signal loss value in the corresponding situation to the minimum transmit power of the signal booster.

Alternatively, the initial transmit power value ($P_{init\_signalbooster}$) can be determined as a value corresponding to X% of the maximum transmit power of the signal booster. In this case, the X is an integer between 0 and 100.

Secondly, besides the passive setting method, the initial transmit power value ($P_{init\_signalbooster}$) can be determined as a value resulting from adding/subtracting a predetermined offset to/from a user equipment's transmit power value directly/indirectly recognized by the signal booster [Active Setting].

For instance, a user equipment's transmit power, which is estimated by the signal booster or received from the user equipment, can be determined as the initial transmit power value ($P_{init\_signalbooster}$) in the signal booster.

For another instance, the signal booster stores a statistical signal loss model (or value) in accordance with each place and situation and is then able to recognize it through a user's direct/indirect input. The initial transmit power value ($P_{init\_signalbooster}$) in the signal booster can be determined as a value resulting from adding a signal loss value in the corresponding situation to the user equipment's transmit power that is estimated by the signal booster or received from the user equipment.

The above-mentioned offset value for the initial power control applied to the signal booster, i.e., the initial transmit power increment/decrement value ($\Delta P_{init}$) can be configured with at least one value. For instance, the initial transmit power increment/decrement value ($\Delta P_{init}$) may include a signal value such as $\Delta P_{init}=2$ dB (yet, an initial value may be 0)'. For another instance, the initial transmit power increment/decrement value ($\Delta P_{init}$) may be configured with several values including '$\Delta P_{init}=\{-1, 0, 1, 3\}$ [dB]', '$\Delta P_{init}=\{-10, -3, -1, 0, 1, 3, 10\}$ [dB]' and the like. In case that there are several offset values, the initial transmit power increment/decrement value ($\Delta P_{init}$) may be variable in each prescribed time interval.

Moreover, the initial transmit power increment/decrement value ($\Delta P_{init}$) may be applicable to a time interval amounting to an integer multiplication of a symbo9l, subframe or frame of a communication system.

Besides, the preset time (t0) may amount to an integer multiplication of a symbo9l, subframe or frame of a communication system.

Using the above-described method, the signal booster according to the present invention performs the initial transmit power control and is then able to boost and transmit a signal from a user equipment. In this following description, as a process after the initial transmit power control by the above description or an independent process, a general power control, which can be performed in the signal booster according to the present invention, is explained.

In case of the general power control, a converging step may be performed before the general power control. In particular, the signal booster boosts a transmit power up to a maximum transmit power with reference to an initial transmit power and a base station sends a TPC (transmit power control) message for controlling a transmit power of a user equipment based on the boosted transmit power to lead the user equipment to lower its transmit power. Once the transmit power of the signal booster converges to the transmit power of the user equipment, the signal booster can lower the transmit power until receiving the TPC for the transmit power increase for the user equipment from the base station. Through this process, if the transmit power of the signal booster converges to a predetermined level, a general power control process is performed as follows.

The general power control in the signal booster can be expressed as Formula 2.

$$P_{signalbooster}(t)=P_{signalbooster}(t-t0)+\Delta P \quad \text{[Formula 2]}$$

The $P_{signalbooster}$ (t) may indicate a transmit power value at a time t, the $\Delta P$ may indicate a transmit power increment/decrement value, and the t0 may indicate a preset time interval likely to be the same as the aforementioned preset time interval t0 in the initial transmit power control mentioned in the foregoing description, by which the present invention may be non-limited.

The signal booster can perform the power control identical to the initial power control or the power control using a separate power offset ($\Delta P$) value, after the initial transmit power period (tinitial_period). In this case, the transmit power at a current time t may include one of the followings: i) a transmit power at a previous time t−1, ii) a cumulative average transmit power or a cumulative transmit power up to a previous time t−1; and (iii) a cumulative average transmit power or a cumulative transmit power at a specific time t-a up to a previous time t−1. In this case, 'a' is a value equal to a monitoring interval length for a transmit power control of a signal booster or may include a value, which amounts to an integer multiplication of a symbol, subframe or frame of a communication system, to be applied as a preset value.

An update of a general power control of a signal booster may vary depending on a supportive communication system, which may include a value corresponding to an integer multiplication of a symbol, subframe or frame of the corresponding communication system.

As mentioned in the foregoing description, a user equipment, which uses the signal booster configured to perform the above-described transmit power control, can inform a base station that the user equipment is transmitting a signal via the signal booster.

In particular, the user equipment can inform the base station of an information indicating whether to receive the help of the signal booster and/or an information on a transmission status using at least one of the following methods.

First of all, the user equipment can inform the base station of an information on a signal transmission mode, i.e., an information indicating whether a signal is transmitted by the user equipment or via the signal booster.

Secondly, the user equipment receives a current transmit power information from the signal booster and is then able to transmit the received information to the base station.

Thirdly, the user equipment transmits a maximum transmit power of the currently used signal booster to the base station.

Fourthly, the user equipment can use a reception power information forwarded by the signal booster instead of a DL reception power information (e.g., RSSI) estimated by the user equipment.

In particular, the user equipment informs the base station whether the user equipment uses the signal booster or transmits the signal by itself, thereby enabling the base station to shorten a converging period of the UL transmit power of the user equipment to considerably decrease the interference on neighbor user equipments and power consumption of its own. The user equipment enables the base station to be aware of a substantial transmit power of the user equipment recognizable by the base station (i.e., the transmit power value of the signal booster), thereby enabling the base station to control the user equipment that uses the signal booster. Through this method, the base station can considerably reduce the error of the location based service, which may occur due to the use of the signal booster.

Figure 7:
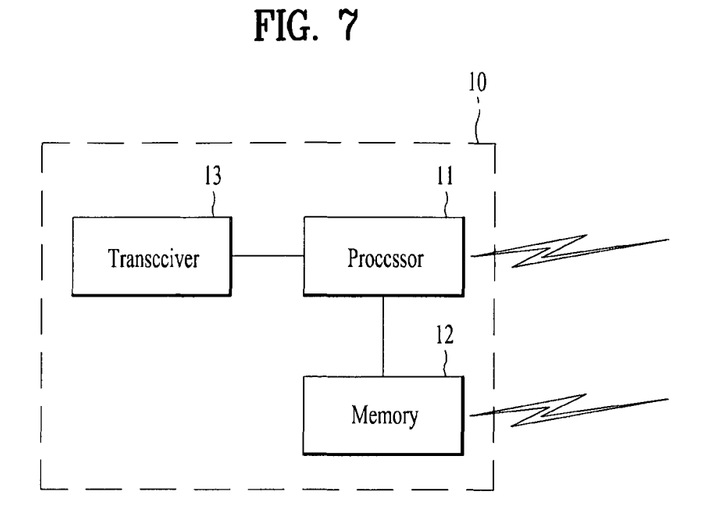
FIG. 7 is a diagram for one example of a signal booster according to one embodiment of the present invention.

FIG. 7 is a diagram for one example of a signal booster according to one embodiment of the present invention.

Referring to FIG. 7, a signal booster device 10 may include a processor 11, a memory 12 and a transceiver 13. In particular, the transceiver 13 can transmit/receive a radio signal. The processor 11 is connected to the transceiver 13 to implement at least one physical layer and/or MAC layer in various communication systems. The processor 11 may be configured to perform operations according to various embodiments of the present invention. The memory 12 is included inside the processor 11 or installed outside the processor 11 to be connected to the processor 11 via a means well-known to the public.

In the above-mentioned detailed configurations of the device, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

The invention claimed is:

1. A method of controlling a power of a signal booster in a wireless communication system, the method comprising:
determining an initial transmit power value of the signal booster; and
applying an initial transmit power increment/decrement value to a sum of the initial transmit power value and the initial transmit power increment/decrement value in each preset time interval during an initial power control period,
wherein the initial transmit power value results from subtracting a signal loss value from a maximum transmit power of the signal booster.

2. The method of claim 1, wherein the signal loss value is determined in statistical signal loss data previously saved in the signal booster.

3. The method of claim 1, wherein the initial power control period comprises a period taken for a difference between a value having the initial transmit power increment/decrement value applied thereto and a transmit power value of a user equipment transmitting a signal to be boosted by the signal booster to become equal to or smaller than a preset value.

4. The method of claim 1, wherein the initial transmit power increment/decrement value varies in the each preset time interval.

5. The method of claim 1, wherein the preset time interval comprises an integer multiplication of at least one of a symbol, subframe and frame of a communication system including the signal booster.

6. The method of claim 1, wherein the power controlling method is expressed as a following formula:

$$P_{signalbooster}(0) = P_{init\_signalbooster} + \Delta P_{init} \text{ if } t=0; \text{ and}$$

$$P_{signalbooster}(t) = P_{signalbooster}(t-t0) + \Delta P_{init} \text{ if } t \leq t_{initial\_period},$$

wherein the $P_{signalbooster}$ (t) indicates a transmit power value at a time t,
wherein the $P_{init\_signalbooster}$ indicates the initial transmit power value,
wherein the $\Delta P_{init}$ indicates the initial transmit power increment/decrement value, and
wherein the t0 indicates the preset time interval.

7. The method of claim 1, wherein the power controlling method of the signal booster after the initial power control period is expressed as a following formula:

$$P_{signalbooster}(t) = P_{signalbooster}(t-t0) + \Delta P,$$

wherein the $P_{signalbooster}$ (t) indicates a transmit power value at a time t,
wherein the $\Delta P$ indicates the transmit power increment/decrement value, and
wherein the t0 indicates a preset time interval.

8. The method of claim 1, wherein a user equipment transmitting a signal. to be boosted by the signal booster transmit at least one selected from the group consisting of an information indicating whether to transmit a signal via the signal booster, a current transmit power of the signal booster and a maximum transmit power of the signal booster to a base station.

9. A signal booster in a wireless communication system, the signal booster comprising:
a transceiving module; and
a processor configured to:
determine an initial transmit power value of the signal booster, and
apply an initial transmit power increment/decrement value to a sum of the initial transmit power value and the initial transmit power increment/decrement value in each preset time interval during an initial power control period,
wherein the initial transmit power value results from subtracting a signal loss value from a maximum transmit power of the signal booster.

* * * * *